United States Patent
Choi et al.

(10) Patent No.: US 7,353,112 B2
(45) Date of Patent: Apr. 1, 2008

(54) INPUT SYSTEM BASED ON A THREE-DIMENSIONAL INERTIAL NAVIGATION SYSTEM AND TRAJECTORY ESTIMATION METHOD THEREOF

(75) Inventors: Eun-seok Choi, Gangnam-gu (KR);
Dong-yoon Kim, Seodaemun-gu (KR);
Won-chul Bang, Sungnam-si (KR);
Wook Chang, Gangnam-gu (KR);
Kyoung-ho Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 10/802,056

(22) Filed: Mar. 17, 2004

(65) Prior Publication Data

US 2004/0236500 A1 Nov. 25, 2004

(30) Foreign Application Priority Data

Mar. 18, 2003 (KR) ...................... 10-2003-0016779

(51) Int. Cl.
*G01P 15/00* (2006.01)
(52) U.S. Cl. ........................ 701/220; 73/1.38
(58) Field of Classification Search ................ 701/220, 701/221, 213, 217; 73/1.38; 342/357.08, 342/357.14, 457
See application file for complete search history.

(56) References Cited

U.S. PATENT DOCUMENTS

| | | | | |
|---|---|---|---|---|
| 3,545,266 A | * | 12/1970 | Wilson | 73/152.54 |
| 5,956,660 A | * | 9/1999 | Neumann | 702/150 |
| 6,282,496 B1 | * | 8/2001 | Chowdhary | 701/220 |
| 6,305,221 B1 | * | 10/2001 | Hutchings | 73/488 |
| 6,337,688 B1 | * | 1/2002 | Berstis | 345/473 |
| 6,542,824 B1 | * | 4/2003 | Berstis | 701/220 |
| 6,658,354 B2 | * | 12/2003 | Lin | 701/214 |

* cited by examiner

*Primary Examiner*—Dalena Tran
(74) *Attorney, Agent, or Firm*—Sughrue Mion, PLLC

(57) ABSTRACT

An input system based on a three-dimensional inertial navigation system and a trajectory estimation method thereof is disclosed. The input system based on the three-dimensional inertial navigation system according to the present invention has acceleration sensors for outputting acceleration information just before motions, acceleration information on the motions, and acceleration information just after the motions; a rotation angle information estimation-computing portion for estimating rotation angle information on the motions through a predetermined computing process based on the outputted acceleration information just before the motions and acceleration information just after the motions; a conversion-computing unit for calculating position information on the motions based on the estimated rotation angle information on the motions and the outputted acceleration information on the motions; and an optimal plane-computing unit for projecting the position information on the motions onto an optimal plane.

22 Claims, 8 Drawing Sheets

INPUT SYSTEM BASED ON A THREE-DIMENSIONAL INERTIAL NAVIGATION SYSTEM AND TRAJECTORY ESTIMATION METHOD THEREOF

CROSS-REFERENCE TO RELATED APPLICATIONS

This application claims the priority of Korean Patent Application No. 2003-16779, filed on Mar. 13, 2003, in the Korean Intellectual Property Office, the disclosure of which is incorporated herein in its entirety by reference.

BACKGROUND OF THE INVENTION

1. Field of the Invention

An apparatus consistent with the present invention relates to an input system based on a three-dimensional inertial navigation system and a trajectory estimation method thereof.

2. Description of the Related Art

With progress in the information age, it is more frequently demanded to access and produce information anytime and anywhere, rather than a specific space in computers-equipped environments. Such demands are satisfied with personal portable devices that have been developed and are widely spread, but further research is still required on input systems suitable for such personal portable devices. The specifications required for the input system for personal portable devices include an easy-to-carry and easy-to-input device, thus, there is a demand to develop an input system that is smaller than personal portable devices as well as being easy-to-carry. Further, the nature of the personal portable devices is to facilitate the inputs of new data anytime and anywhere, so that an input system is required which enables users to input such data as they naturally write. In particular, if such an input system can recover writing motions as naturally done on a general plane, a free space, or a sheet of paper so as to enable users to input characters, graphics, gestures, and so on, the input system can be utilized as an excellent input system since it is excellent in the aspect of "universal purpose" and also does not require a particular learning course for use.

Accordingly, in order to meet the demands on the input system as described above, an input system has been proposed that can input data in space using the concept of a three-dimensional inertial navigation system.

The three-dimensional inertial navigation system refers to a system that detects three-axis acceleration information and three-axis angular velocity information and applies the detected information to a moving object in order to estimate positions and attitudes of the moving object in the three-dimensional space. The three-dimensional inertial navigation system calculates the attitudes of the object and corrects the acceleration information using an integral value of angular velocity information estimation values, accordingly, calculates velocity information by integrating the corrected acceleration information once, and calculates position information by integrating the corrected acceleration information twice.

FIG. 1 is a block diagram illustrating an input system using a conventional inertial navigation system.

The input system using the conventional inertial navigation system includes an input part 10 and a host device 20.

The host device 20 displays an image corresponding to motions based on the motions from the input part 10.

The input part 10 includes acceleration sensors 11, angular velocity sensors 12, a rotation angle information-computing unit 13, conversion-computing unit 14, and a transmission unit 15.

The acceleration sensors 11 generate acceleration information $A_b(A_{bx}, A_{by}, A_{bz})$ corresponding to motions based on the motions of the input part 10, and output the same to the conversion-computing unit 14. The subscript b in the acceleration information denotes acceleration information for a body frame of the input part and the subscripts x, y, and z denote information on x-axis, y-axis, and z-axis.

The angular velocity sensors 12 generate angular velocity information $W_b(W_{bx}, W_{by}, W_{bz})$ corresponding to motions based on the motions of the input part 10, and output the same to the rotation angle information-computing unit 13. The subscript b of the angular velocity information denotes angular velocity information for the body frame of the input part, and the subscripts x, y, and z denote information on x-axis, y-axis, and z-axis.

The rotation angle information-computing unit 13 inputs angular velocity information from the angular velocity sensors 12. The inputted angular velocity information is converted into rotation angle information $\chi(\Phi, \theta, \psi)$ through a predetermined computing process. The predetermined computing process for the conversion into the rotation angle information is well known to those skilled in the art, so a detailed description on the process will be omitted in the disclosure.

The conversion-computing unit 14 inputs acceleration information and rotation angle information. The conversion-computing unit 14 calculates the attitudes of the input part 10 based on the rotation angle information, corrects the acceleration information based on the rotation angle information, calculates velocity information by integrating the corrected acceleration information once, and calculates position information by integrating the corrected acceleration information twice. Such calculations can be performed based on Equations 1, 2, and 3 as follows.

Prior to explanations of the following Equations, definitions are made for terms used in the Equations as follows:

A body frame is a frame from which acceleration information and angular velocity information can be detected in correspondence to actual motions of the input part 10.

A navigation frame is a reference frame for calculating information applicable for a host device 20 by applying predetermined computing matrices based on a result detected from the body frame. Herein, the coordinate axes for the navigation frame are referred to as $X_0$, $Y_0$, and $Z_0$.

Rotation angle information is as follows: The coordinate axes for the navigation frame and the body frame coincide with each other when there is no rotation at an initial time. When the navigation frame and the body frame coincide with each other at the initial time and the coordinate axes for the body frame are referred to as $X_0$, $Y_0$, and $Z_0$, $\Psi$ denotes the rotation angle information for the $Z_0$ axis. Further, $\theta$ denotes rotation angle information for a $Y_1$ axis indicating an axis after the $Y_0$ axis is rotated as much as $\Psi$. $\Phi$ denotes rotation angle information for a $X_2$ axis indicating an axis after the $X_0$ axis is rotated as much as $\Psi$ and $\theta$, respectively.

A 3×3 matrix for converting a vector in the body frame into a vector in the navigation frame is as follows:

$$C_b^n(\chi) = \begin{bmatrix} \theta_c \Psi_c & -\phi_c \Psi_s + \phi_s \theta_s \Psi_c & \phi_s \Psi_s + \phi_c \theta_s \Psi_c \\ \theta_c \Psi_s & \phi_c \Psi_c + \varphi_s \theta_s \Psi_s & -\phi_s \Psi_c + \phi_c \theta_s \Psi_s \\ -\theta_s & \phi_s \theta_c & \phi_c \theta_c \end{bmatrix}$$

In here, the subscripts s, c, and t stand for sine, cosine, and tangent functions, respectively, and the $\chi$ denotes rotation angle information in a 3×1 matrix.

The following is a matrix for calculating the rotation angle information based on the angular velocity information in the body frame:

$$R(\chi) = \begin{bmatrix} 1 & \phi_s \theta_t & \phi_c \theta_t \\ 0 & \phi_c & -\phi_s \\ 0 & \phi_s/\theta_c & \phi_c/\theta_c \end{bmatrix}$$

Here, the subscripts s, c, and t stand for sine, cosine, and tangent functions, respectively, and the $\chi$ denotes the rotation angle information in a 3×1 matrix.

If the $A_b$ denotes the acceleration information in the body frame, the $W_b$ denotes the angular velocity information in the body frame, R denotes a matrix for calculating the rotation angle information based on the angular velocity information in the body frame, G is the gravitational acceleration, and the $C_b^n$ denotes a matrix for converting a vector in the body frame into a vector in the navigation frame, position information in the navigation frame is $P_n$, velocity information in the navigation frame is $V_n$, and the rotation angle information is $\chi$. These variables can be expressed in Equations 1, 2, and 3 as follows:

$$dP_n = V_n \quad \text{[Equation 1]}$$

$$dV_n = C_b^n(\chi)A_b - G \quad \text{[Equation 2]}$$

$$d\chi = R(\chi)W_b \quad \text{[Equation 3]}$$

Here, $P_n$, $V_n$, $A_b$, G, and $W_b$ are a 3×1 matrix, respectively, G is a matrix of $[0,0, g]^T$, and $dP_n$, $dV_n$, and $d\chi$ denotes differentiations of $P_n$, $V_n$, and $\chi$ with respect to time, respectively.

Accordingly, the acceleration information and the angular velocity information for the body frame outputted from the acceleration sensors and the angular velocity sensors respectively are computed and converted into velocity information and position information for the navigation frame, and a motion image corresponding to motions in the three-dimensional space based on the conversion-computed position information is projected to an optimal projection plane, and then outputted to the transmission unit 15.

The transmission unit 15 outputs the projected position information to the host device 20.

By the above fashion, the motions of the input part 10 are displayed on the host device 20.

However, with both the acceleration sensors and the angular velocity sensors used as above, the input part becomes heavy, which brings out a drawback that it is not suitable for portability. Also, there is a drawback in that the price of the angular velocity sensors is so high that the input parts using them become expensive. Further, there exists a drawback in that an amount of power consumption becomes large since the angular velocity sensors and the acceleration sensors have to be all driven. Furthermore, there exists troublesomeness in that a correction job has to be performed in case that the input part is equipped with the angular velocity sensors since the use of the angular velocity sensors inevitably requires an initial correction job.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems discussed above.

An apparatus consistent with the present invention provides an input system based on a three-dimensional inertial navigation system and a trajectory estimation method thereof, capable of recovering motions in the three-dimensional space by using only three acceleration sensors without any angular velocity sensor, that is, without using both three acceleration sensors and three angular velocity sensors as in the three-dimensional inertial navigation system.

The above aspect is achieved by providing an input system based on a three-dimensional inertial navigation system and having an input part and a host device, which detects motion position information corresponding to three-dimensional motions of the input part and outputs the detected motion position information to the host device. The input system comprises acceleration sensors for outputting acceleration information just before the motions (hereinafter, referred to as pre-motion acceleration information where applicable), acceleration information on the motions (hereinafter, referred to as motion acceleration information where applicable), and acceleration information just after the motions (hereinafter, referred to as post-motion acceleration information where applicable); a rotation angle information estimation-computing portion for estimating rotation angle information $\Phi$, $\theta$, and $\Psi$ on the motions (hereinafter, referred to as motion rotation angle information where applicable) through a predetermined computing process based on the outputted pre-motion acceleration information and post-motion acceleration information; a conversion-computing unit for calculating the motion position information based on the estimated motion rotation angle information and the outputted motion acceleration information; and an optimal plane-computing unit for projecting the motion position information onto an optimal plane.

The rotation angle information estimation-computing portion includes a first computing unit for calculating rotation angle information $\Phi 1$, $\theta 1$, and $\Psi 1$ just before the motions (hereinafter, referred to as pre-motion rotation angle information where applicable) and rotation angle information $\Phi 2$, $\theta 2$, and $\Psi 2$ just after the motions (hereinafter, referred to as post-motion rotation angle information where applicable) through a predetermined computing process based on the outputted pre-motion acceleration information and post-motion acceleration information; and a second computing unit for calculating the motion rotation angle information through a predetermined computing process based on the calculated pre-motion rotation angle information and post-motion rotation angle information.

Preferably, in the first computing unit, the pre-motion rotation angle information $\Phi 1$ and the post-motion rotation angle information $\Phi 2$ become $$\Phi 1 = \tan^{-1}\left(\frac{A_{by1}}{A_{bz1}}\right)$$

and $$\Phi 2 = \tan^{-1}\left(\frac{A_{by2}}{A_{bz2}}\right),$$

respectively, and, here, if coordinate axes of a body frame of the input part are denoted as X, Y, and Z, $A_{by1}$ and $A_{by2}$ denote the pre-motion acceleration information and the post-motion acceleration information for the Y axis respectively, and $A_{bz1}$ and $A_{bz2}$ denote the pre-motion acceleration information and the post-motion acceleration information for the Z axis respectively, and, if coordinate axes for the navigation frame are denoted as $X_0$, $Y_0$, and $Z_0$, Ψ1 and Ψ2 denote the pre-motion rotation angle information and the post-motion rotation angle information for the $Z_0$ axis, and θ1 denotes the pre-motion rotation angle information for a $Y_1$ axis indicating an axis after the $Y_0$ axis is rotated as much as Ψ1, θ2 denotes the post-motion rotation angle information for $Y_1$ axis indicating an axis after the $Y_0$ axis is rotated as much as Ψ2, Φ1 denotes the pre-motion rotation angle information for the $X_2$ indicating an axis after the $X_0$ axis is rotated as much as Ψ1 and θ1, respectively, and Φ2 denotes the pre-motion rotation angle information for the $X_2$ axis indicating an axis after the $X_0$ is rotated as much as Ψ2 and θ2, respectively.

Preferably, in the first computing unit, the pre-motion rotation angle information θ1 and the post-motion rotation angle information θ2 become $$\theta 1 = \tan^{-1}\left(\frac{A_{bx1}}{\sqrt{A_{by1}^2 + A_{bz1}^2}}\right)$$

and $$\theta 2 = \tan^{-1}\left(\frac{A_{bx2}}{\sqrt{A_{by2}^2 + A_{bz2}^2}}\right),$$

respectively, and, here, if coordinate axes of a body frame of the input part are denoted as X, Y, and Z, $A_{bx1}$ and $A_{bx2}$ denote the pre-motion acceleration information and the post-motion acceleration information for the X axis respectively, and $A_{by1}$ and $A_{by2}$ denote the pre-motion acceleration information and the post-motion acceleration information for the Y axis respectively, and $A_{bz1}$ and $A_{bz2}$ denote the pre-motion acceleration information and the post-motion acceleration information for the Z axis respectively, and, if coordinate axes for the navigation frame are denoted as $X_0$, $Y_0$, and $Z_0$, Ψ1 and Ψ2 denote the pre-motion rotation angle information and the post-motion rotation angle information for the $Z_0$ axis, and θ1 denotes the pre-motion rotation angle information for a $Y_1$ axis indicating an axis after the $Y_0$ axis is rotated as much as Ψ1, and θ2 denotes the post-motion rotation angle information for $Y_1$ axis indicating an axis after the $Y_0$ axis is rotated as much as Ψ2.

Preferably, in the second computing unit, the motion rotation angle information Φ becomes Φ(t)=a*t+b, and, here, if $t_1$ denotes time just before the motions, $t_2$ denotes time just after the motions, a denotes $[\Phi(t_2)-\Phi(t_1)]/(t_2-t_1)$, b denotes $-a*t_1+\Phi(t_1)$, and coordinate axes for the navigation frame are denoted as $X_0$, $Y_0$, and $Z_0$, the Ψ denotes the rotation angle information for the $Z_0$ axis, the θ denotes the rotation angle information for the $Y_1$ axis indicating an axis after the $Y_0$ axis is rotated as much as Ψ, and the Φ denotes the rotation angle information for the $X_2$ axis indicating an axis after the $X_0$ axis is rotated as much as Ψ and θ, respectively.

Preferably, in the second computing unit, the motion rotation angle information θ becomes θ(t)=c*t+d, and, here, if $t_1$ denotes time just before the motions, $t_2$ denotes time just after the motions, c denotes $[\theta(t_2)-\theta(t_1)]/(t_2-t_1)$, d denotes $-c*t_1+\theta(t_1)$, and coordinate axes are denoted as $X_0$, $Y_0$, and $Z_0$, the Ψ denotes the rotation angle information for the $Z_0$ axis and the θ denotes the rotation angle information for the $Y_1$ axis indicating an axis after the $Y_0$ axis is rotated as much as Ψ.

Further, the above object is achieved by providing the input system based on the three-dimensional inertial navigation system according to the present invention and having an input part and a host device, which detects motion position information corresponding to three-dimensional motions of the input part and outputs the detected motion position information to the host device. The input system comprises acceleration sensors for outputting motion acceleration information; a rotation angle information estimation-computing portion for estimating motion rotation angle information Φ, θ, and Ψ based on acceleration information based on the gravitational acceleration separated from the outputted motion acceleration information; a conversion-computing unit for calculating motion position information based on the estimated motion rotation angle information and the outputted motion acceleration information; and an optimal plane-computing unit for projecting the motion position information onto an optimal plane.

The rotation angle information estimation-computing portion includes a separation unit for separating acceleration information based on the motions of the input part itself and acceleration information based on the gravitational acceleration from the outputted motion acceleration information based on a predetermined process; and a computing unit for calculating the motion rotation angle information through the predetermined computing process based on the acceleration information based on the separated gravitational acceleration.

Preferably, but not necessarily, the predetermined process for separating the acceleration information based on the gravitational acceleration from the motion acceleration information is to pass the motion acceleration information through a low-pass filter.

Preferably, but not necessarily, in the computing unit, the motion rotation angle information Φ becomes $$\Phi = \tan^{-1}\left(\frac{A_{by}}{A_{bz}}\right),$$

and, here, if coordinate axes of a body frame of the input part are denoted as X, Y, and Z, $A_{by}$ denotes acceleration information for the Y axis and $A_{bz}$ denotes acceleration information for the Z axis, and, if coordinate axes for a navigation frame are denoted as $X_0$, $Y_0$, and $Z_0$, $\Psi$ denotes rotation angle information for the $Z_0$ axis, $\theta$ denotes rotation angle information for a $Y_1$ axis indicating an axis after the $Y_0$ axis is rotated as much as $\Psi$, and $\Phi$ denotes rotation angle information for an $X_2$ indicating an axis after the $X_0$ is rotated as much as $\Psi$ and $\theta$, respectively.

Preferably, but not necessarily, in the computing unit, the motion rotation angle information $\theta$ becomes $$\theta = \tan^{-1}\left(\frac{A_{bx}}{\sqrt{A_{by}^2 + A_{bz}^2}}\right),$$

and, here, if coordinate axes for the body frame are denoted as X, Y, and Z, $A_{bx}$ denotes acceleration information for the X axis, $A_{by}$ denotes acceleration information for the Y axis, $A_{bz}$ denotes acceleration information for the Z axis, and coordinate axes for the navigation frame are denoted as $X_0$, $Y_0$, and $Z_0$, $\Psi$ denotes rotation angle information for the $Z_0$ axis and $\theta$ denotes rotation angle information for a $Y_1$ axis indicating an axis after the $Y_0$ is rotated as much as $\Psi$.

Further, the above object is achieved by providing a trajectory estimation method for an input system based on a three-dimensional inertial navigation system and having an input part and a host device according to the present invention, which detects motion position information corresponding to three-dimensional motions of the input part and outputs the detected motion position information to the host device. The method comprises steps of (a) outputting motion acceleration information, pre-motion acceleration information, and post-motion acceleration information just after the motions; (b) estimating motion rotation angle information $\Phi$, $\theta$, and $\Psi$ through a predetermined computing process based on the outputted pre-motion acceleration information and post-motion acceleration information; (c) calculating the motion position information based on the estimated motion rotation angle information and the outputted motion acceleration information; and (d) projecting the motion position information onto an optimal plane.

The step (b) includes steps of (b1) calculating pre-motion rotation angle information $\Phi 1$, $\theta 1$, and $\Psi 1$ and post-motion rotation angle information $\Phi 2$, $\theta 2$, and $\Psi 2$ through a predetermined computing process based on the outputted pre-motion acceleration information and post-motion acceleration information; and (b2) calculating the motion rotation angle information through a predetermined computing process based on the calculated pre-motion rotation angle information and post-motion rotation angle information.

Preferably, but not necessarily, in the step (b1), the pre-motion rotation angle information $\Phi 1$ and the post-motion rotation angle information $\Phi 2$ become $$\Phi 1 = \tan^{-1}\left(\frac{A_{by1}}{A_{bz1}}\right) \text{ and } \Phi 2 = \tan^{-1}\left(\frac{A_{by2}}{A_{bz2}}\right)$$

respectively, and, here, if coordinate axes of a body frame of the input part are denoted as X, Y, and Z, $A_{by1}$ and $A_{by2}$ denote the pre-motion acceleration information and the post-motion acceleration information for the Y axis respectively, and $A_{bz1}$ and $A_{bz2}$ denote the pre-motion acceleration information and the post-motion acceleration information for the Z axis respectively, and, if coordinate axes for the navigation frame are denoted as $X_0$, $Y_0$, and $Z_0$, $\Psi 1$ and $\Psi 2$ denote the pre-motion rotation angle information and the post-motion rotation angle information for the $Z_0$ axis, and $\theta 1$ denotes the pre-motion rotation angle information for a $Y_1$ axis indicating an axis after the $Y_0$ axis is rotated as much as $\Psi 1$, $\theta 2$ denotes the post-motion rotation angle information for $Y_1$ axis indicating an axis after the $Y_0$ axis is rotated as much as $\Psi 2$, $\Phi 1$ denotes the pre-motion rotation angle information for the $X_2$ indicating an axis after the $X_0$ axis is rotated as much as $\Psi 1$ and $\theta 1$, respectively, and $\Phi 2$ denotes the pre-motion rotation angle information for the $X_2$ axis indicating an axis after the $X_0$ is rotated as much as $\Psi 1$, $\theta 2$, respectively.

Preferably, but not necessarily, in the step (b1), the pre-motion rotation angle information $\theta 1$ and the post-motion rotation angle information $\theta 2$ become $$\theta 1 = \tan^{-1}\left(\frac{A_{bx1}}{\sqrt{A_{by1}^2 + A_{bz1}^2}}\right) \text{ and } \theta 2 = \tan^{-1}\left(\frac{A_{bx2}}{\sqrt{A_{by2}^2 + A_{bz2}^2}}\right),$$

respectively, and, here, if coordinate axes of a body frame of the input part are denoted as X, Y, and Z, $A_{bx1}$ and $A_{bx2}$ denote the pre-motion acceleration information and the post-motion acceleration information for the X axis respectively, and $A_{by1}$ and $A_{by2}$ denote the pre-motion acceleration information and the post-motion acceleration information for the Y axis respectively, and $A_{bz1}$ and $A_{bz2}$ denote the pre-motion acceleration information and the post-motion acceleration information for the Z axis respectively, and, if coordinate axes for the navigation frame are denoted as $X_0$, $Y_0$, and $Z_0$, $\Psi 1$ and $\Psi 2$ denote the pre-motion rotation angle information and the post-motion rotation angle information for the $Z_0$ axis, and $\theta 1$ denotes the pre-motion rotation angle information for a $Y_1$ axis indicating an axis after the $Y_0$ axis is rotated as much as $\Psi 1$, and $\theta 2$ denotes the post-motion rotation angle information for $Y_1$ axis indicating an axis after the $Y_0$ axis is rotated as much as $\Psi 2$.

Preferably, but not necessarily, in the step (b2), the motion rotation angle information $\Phi$ becomes $\Phi(t)=a*t+b$ and, here, if $t_1$ denotes time just before the motions, $t_2$ denotes time just after the motions, a denotes $[\Phi(t_2)-\Phi(t_1)]/(t_2-t_1)$, b denotes $-a*t, +\Phi(t_1)$, and coordinate axes are denoted as $X_0$, $Y_0$, and $Z_0$, the $\Psi$ denotes the rotation angle information for the $Z_0$ axis, the $\theta$ denotes the rotation angle information for the $Y_1$ axis indicating an axis after the $Y_0$ axis is rotated as much as $\Psi$, and the $\Phi$ denotes the rotation angle information for the $X_2$ axis indicating an axis after the $X_0$ axis is rotated as much as $\Psi$ and $\theta$, respectively.

Preferably, but not necessarily, in the step (b2), the motion rotation angle information $\theta$ becomes $\theta(t)=c*t+d$ and, here, if $t_1$ denotes time just before the motions, $t_2$ denotes time just after the motions, c denotes $[\theta(t_2)-\theta(t_2t_1)]/(t_2-t_1)$, d denotes $-c*t, +\theta(t_1)$, and coordinate axes are denoted as $X_0$, $Y_0$, and $Z_0$, the $\Psi$ denotes the rotation angle information for the $Z_0$ axis and the $\theta$ denotes the rotation angle information for the $Y_1$ axis indicating an axis after the $Y_0$ axis is rotated as much as $\Psi$.

Further, the above object is achieved by providing a trajectory estimation method for an input system based on a three-dimensional inertial navigation system and having an input part and a host device, which detects motion position information corresponding to motions of the input part based on three-dimensional motions of the input part and outputs the detected motion position information to the host device. The method comprises steps of: (a) outputting motion acceleration information; (b) estimating motion rotation angle information $\Phi$, $\theta$, and $\Psi$ based on acceleration information based on the gravitational acceleration separated from the outputted motion acceleration information; (c) calculating motion position information based on the estimated motion rotation angle information and the outputted motion acceleration information; and (d) projecting the motion position information onto an optimal plane.

The step (b) includes steps of (b1) separating acceleration information based on the motions of the input part itself and acceleration information based on the gravitational acceleration from the outputted motion acceleration information based on a predetermined process; and (b2) calculating the motion rotation angle information through the predetermined computing process based on the acceleration information based on the separated gravitational acceleration.

Preferably, but not necessarily, the predetermined process in the step (b1) is to pass the motion acceleration information through a low-pass filter.

Preferably, but not necessarily, the motion rotation angle information $\Phi$ in the step (b2) becomes $$\Phi = \tan^{-1}\left(\frac{A_{by}}{A_{bz}}\right)$$

and, here, if coordinate axes of a body frame of the input part are denoted as X, Y, and Z, $A_{by}$ denotes acceleration information for the Y axis and $A_{bz}$ denotes acceleration information for the Z axis, and, if coordinate axes for a navigation frame are denoted as $X_0$, $Y_0$, and $Z_0$, $\Psi$ denotes rotation angle information for the $Z_0$ axis, $\theta$ denotes rotation angle information for a $Y_1$ axis indicating an axis after the $Y_0$ axis is rotated as much as $\Psi$, and $\Phi$ denotes rotation angle information for an $X_2$ indicating an axis after the $X_0$ is rotated as much as $\Psi$ and $\theta$, respectively.

Preferably, but not necessarily, the motion rotation angle information $\theta$ in the step (b2) becomes $$\theta = \tan^{-1}\left(\frac{A_{bx}}{\sqrt{A_{by}^2 + A_{bz}^2}}\right)$$

and, here, if coordinate axes for the body frame are denoted as X, Y, and Z, $A_{bx}$ denotes acceleration information for the X axis, $A_{by}$ denotes acceleration information for the Y axis, $A_{bz}$ denotes acceleration information for the Z axis, and coordinate axes for the navigation frame are denoted as $X_0$, $Y_0$, and $Z_0$, $\Psi$ denotes rotation angle information for the $Z_0$ axis and $\theta$ denotes rotation angle information for a $Y_1$ axis indicating an axis after the $Y_0$ is as much as $\Psi$.

Accordingly, the present invention can recover the three-dimensional motions by using only the three acceleration sensors without the angular velocity sensors in the three-dimensional inertial navigation system.

BRIEF DESCRIPTION OF THE DRAWINGS

The features and advantages of the present invention will become more apparent by describing in detail exemplary embodiments thereof with reference to the following drawings in which like reference numerals refer to like elements, and wherein.

DETAILED DESCRIPTION OF ILLUSTRATIVE, NON-LIMITING EMBODIMENTS OF THE INVENTION

Hereinafter, an input system according to an exemplary embodiment of the present invention is described in detail with reference to the accompanying drawings.

Figure 2:
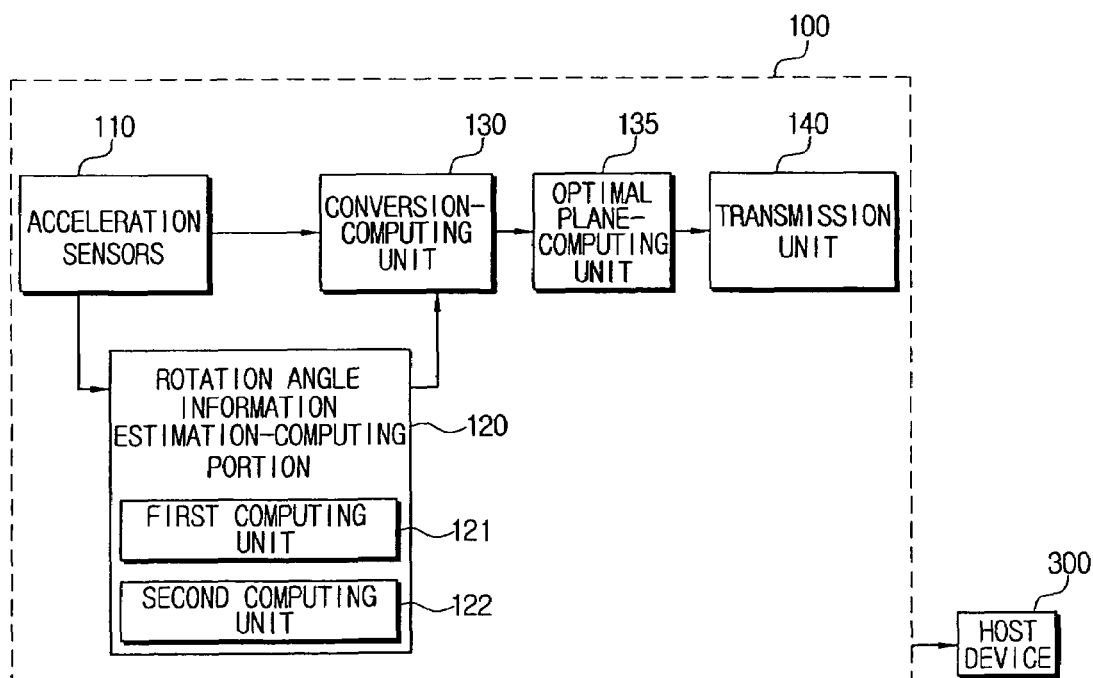
FIG. 2 is a block diagram for showing an input system including an input part equipped with a rotation angle information estimation-computing portion according to an embodiment of the present invention.

FIG. 2 is a block diagram for showing an input system including an input part 100 equipped with a rotation angle information estimation-computing portion 120 according to an embodiment of the present invention.

The input system according to the present invention has the input part 100 and a host device 300.

The input part 100 includes acceleration sensors 110, the rotation angle information estimation-computing portion 120, a conversion-computing unit 130, an optimal plane-computing unit 135 and a transmission unit 140.

The acceleration sensors 110 are provided for three X, $Y_1$ and Z axes of a body frame of the input part 100 according to three x, y, and z axes to be based on motions of the input part 100. The acceleration sensors 110 detect and output acceleration information on motions (hereinafter, referred to as motion acceleration information where applicable), acceleration information just before the motions (hereinafter, referred to as pre-motion acceleration information where applicable), and acceleration information just after the motions (hereinafter, referred to as post-motion acceleration information where applicable), respectively. It is preferable for the three acceleration sensors to be provided in the input part 100, but it is possible to provide two acceleration sensors that can detect acceleration information on two axes.

Definitions for the acceleration information on motions, acceleration information just before the motions, and acceleration information just after the motions, are as follows.

In order to do trajectory estimations for the input part 100 according to an embodiment of FIG. 2, an assumption is necessary that the input part 100 has to remain still just before and after intended motions to be taken by the input part 100. Accordingly, the acceleration sensors 110 according to the present invention can detect acceleration information just before and after intended motions to be taken by the input part 100. The pre-motion acceleration information refers to acceleration information just before intended motions. Further, the post-motion acceleration information refers to acceleration information just after intended motions. Motion acceleration information refers to acceleration information based on intended motions to be taken by a user.

The rotation angle information estimation-computing portion 120 computes and estimates rotation angle information based on pre-motion acceleration information and post-motion acceleration information outputted from the acceleration sensors 110.

The rotation angle information estimation-computing portion 120 according to an embodiment of the present invention includes a first computing unit 121 and a second computing unit 122.

The first computing-unit 121 inputs pre-motion acceleration information and post-motion acceleration information on the input part 100 from the acceleration sensors 110.

The first computing unit 121 computes $\Phi$ and $\theta$ of rotation angle information just before motions through a predetermined computing process based on pre-motion acceleration information. Here, the rotation angle information just before motions is pre-motion rotation angle information corresponding to the pre-motion acceleration information.

The first computing unit 121 computes $\Phi$ and $\theta$ of rotation angle information just after motions through a predetermined computing process based on post-motion acceleration information. In here, the rotation angle information just after motions is post-motion rotation angle information corresponding to the post-motion acceleration information.

In case that coordinate axes for the body frame are denoted as X, Y, and Z, acceleration information for the X axis of the body frame is denoted as $A_{bx}$, acceleration information for the Y axis of the body frame as $A_{by}$, acceleration information for the Z axis of the body frame as $A_{bz}$, rotation angle information for a $Z_0$ axis as $\psi$, and rotation angle information for a $Y_1$ axis, indicating an axis after a $Y_0$ axis is rotated as much as $\Psi$, as $\theta$, Equation 4 expresses rotation angle information $\Phi$ for a $X_2$ axis indicating an axis after the $X_0$ axis is rotated as much as $\Psi$ and $\theta$, respectively.

$$\Phi = \tan^{-1}\left(\frac{A_{by}}{A_{bz}}\right) \quad \text{[Equation 4]}$$

In case that coordinate axes for the body frame are denoted as X, Y, and Z, acceleration information for the X axis of the body frame is denoted as $A_{bx}$, acceleration information for the Y axis of the body frame as $A_{by}$, acceleration information for the Z axis of the body frame as $A_{bz}$, and rotation angle information for a $Z_0$ axis as $\Psi$, rotation angle information $\theta$ for $Y_1$ axis indicating an axis after a $Y_0$ axis is rotated as much as $\Psi$ can be expressed in Equation 5 as follows:

$$\theta = \tan^{-1}\left(\frac{A_{bx}}{\sqrt{A_{by}^2 + A_{bz}^2}}\right) \quad \text{[Equation 5]}$$

Equations 4 and 5 are formulae by which the $\Phi$ and $\theta$ of rotation angle information can be respectively calculated from acceleration information at the state of no motion.

The second computing unit 122 inputs the $\Phi$ and $\theta$ of pre-motion rotation angle information computed from the first computing unit 121.

The second computing unit 122 inputs the $\Phi$ and $\theta$ of post-motion rotation angle information computed from the first computing unit 121.

The second computing unit 122 computes the motion rotation angle information $\Phi$ through a predetermined computing process based on the $\Phi$ of the inputted pre-motion rotation angle information and the $\Phi$ of the inputted post-motion rotation angle information.

The second computing unit 122 computes the motion rotation angle information $\theta$ through a predetermined computing process based on the $\theta$ of the inputted pre-motion rotation angle information and the $\theta$ of the inputted post-motion rotation angle information.

If the time just before a motion is denoted as $t_1$, the time just after a motion as $t_2$, $[\Phi(t_2)-\Phi(t_1)]/(t_2-t_1)$ as a, and $-a*t_1+\Phi(t_1)$ as b, the $\Phi(t)$ of the motion rotation angle information can be expressed in Equation 6 as follows:

$$\Phi(t)=a*t+b \quad \text{[Equation 6]}$$

Further, if the time just before a motion is denoted as $t_1$, the time just after a motion as $t_2$, $[\theta(t_2)-\theta(t_1)]/(t_2-t_1)$ as c, and $-c*t_1+\theta(t_1)$ as d, the $\theta(t)$ of the motion rotation angle information can be expressed in Equation 7 as follows:

$$\theta(t)=c*t+d \quad \text{[Equation 7]}$$

Figure 1:
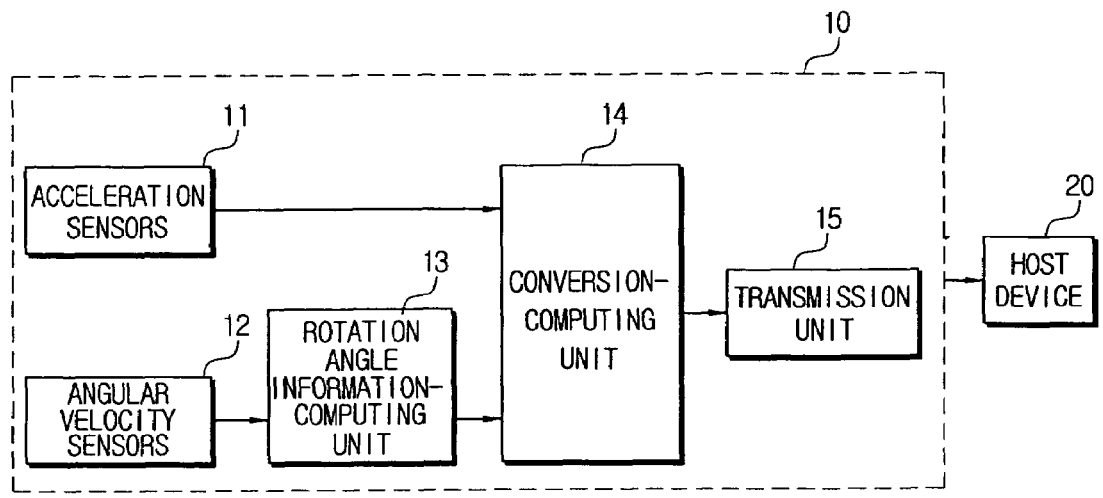
FIG. 1 is a block diagram for showing an input system using a conventional inertial navigation system.

The conversion-computing unit 130 inputs motion acceleration information from the acceleration sensors 110, and inputs motion rotation angle information estimated from the rotation angle information estimating-computing portion 120. Based on the inputted motion acceleration information and motion rotation angle information, motion velocity information $V_n$ and motion position information $P_n$ for the navigation frame are calculated as in the conversion-computing unit of FIG. 1.

The optimal plane-computing unit 135 projects onto a virtual two-dimensional optimal plane the motion position information outputted from the conversion-computing unit 130 to obtain coordinate values.

The transmission unit 140 outputs to the host device 300 the projected position information outputted from the optimal plane-computing unit 135. The transmission unit 140 can be constructed with a wired communication module, but, preferably, with a wireless communication module such as Bluetooth®.

The host device 300 displays position information corresponding to motions based on the motions of the input part 100. The host device 300 is preferably a personal portable device.

Figure 3:
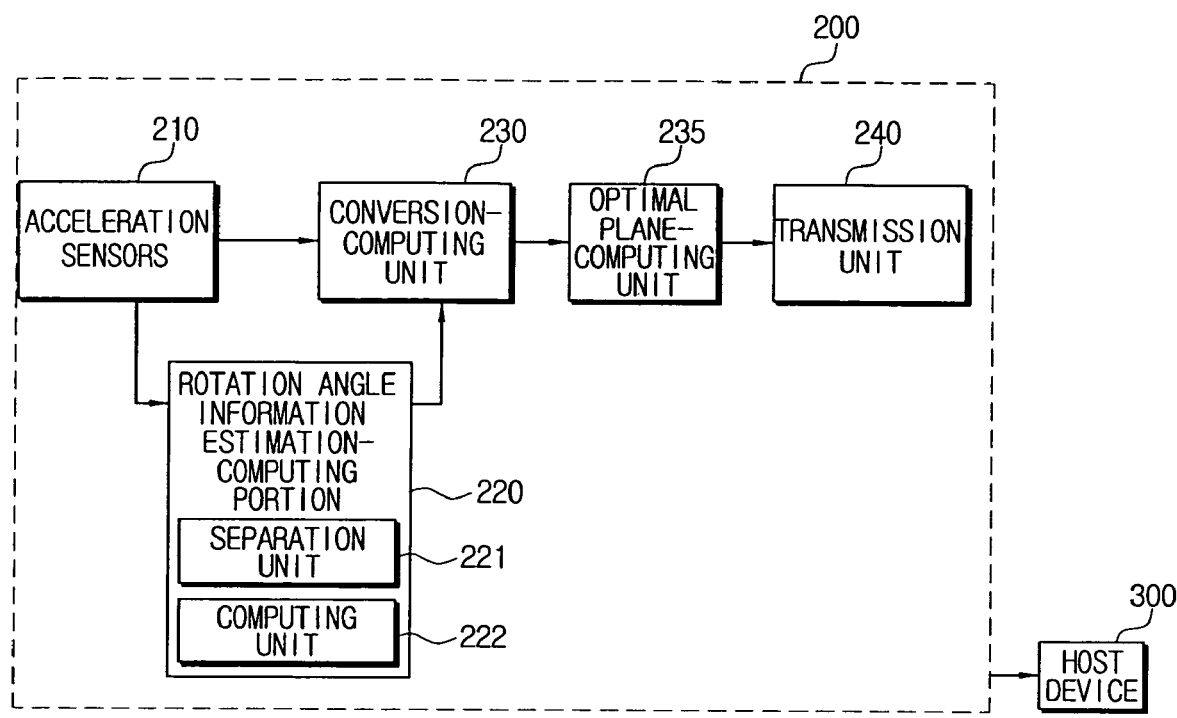
FIG. 3 is a block diagram for showing an input system including an input part equipped with a rotation angle information estimation-computing portion according to another embodiment of the present invention.

FIG. 3 is a block diagram for showing an input system including the input part 200 equipped with the rotation angle information estimation-computing unit 120 according to another embodiment of the present invention.

As described in FIG. 2, the input system according to the present invention includes the host device 300 and the input part 200.

The input part 200 has acceleration sensors 210, a rotation angle information estimation-computing portion 220, a conversion-computing unit 230, an optimal plane-computing unit 235, and a transmission unit 240.

The description on the conversion-computing unit 230 and the transmission unit 240 is the same as in FIG. 2.

Accordingly, hereinafter, a description is made only of the acceleration sensors 210 and the rotation angle information estimation-computing portion 220.

The acceleration sensors 210 according to the present embodiment detect and output motion acceleration information. Differently from the embodiment of FIG. 2, there is no need to detect acceleration information just before and after motions.

The rotation angle information estimation-computing portion 220 according to the present embodiment includes a separation unit 221 and a computing unit 222.

The separation unit 221 inputs motion acceleration information outputted. Thus, the separation unit 221 separates acceleration information based on the motion of the input part 200 itself and acceleration information based on the gravitational acceleration from the inputted motion acceleration information through a predetermined process.

For the predetermined process, it is preferable to provide a low-pass filter (LPF) to the separation unit 221.

In general, the acceleration information based on the gravitational acceleration exists in a lower frequency bandwidth than the acceleration information based on motions themselves. Accordingly, in case that a low-pass filter is provided to the separation unit 221, the acceleration information based on the gravitational acceleration is filtered by the separation unit 221.

The computing unit 222 is inputted with acceleration information based on the gravitational acceleration.

The computing unit 222 calculates motion rotation angle information through Equations 4 and 5 based on acceleration information based on the gravitational acceleration.

In general, a stationary object has no motions and is affected only by the gravitational force, so that acceleration information based on the gravitational acceleration of the motion acceleration information corresponds to a stationary state.

Further, as described above, Equations 4 and 5 can be applied only in a stationary state. Therefore, Equations 4 and 5 can be applied to the acceleration information based on the gravitational acceleration. The computing unit 222 inputs the acceleration information based on the gravitational acceleration, and calculates motion rotation angle information through applications of Equations 4 and 5.

The calculated motion rotation angle information and the motion acceleration information outputted from the acceleration sensors 210 are transmitted to the conversion-computing unit 230, and the motion position information for the navigation frame calculated in the conversion-computing unit 230 is transmitted to the host device 300 through the optimal plane-computing unit 135.

However, the present disclosure does not perform any estimation for $\psi$. This is because the $\psi$ itself does not affect the trajectory recovery for the input part. Therefore, the values for the $\psi$ in the two embodiments are set to zero.

Figure 4A:
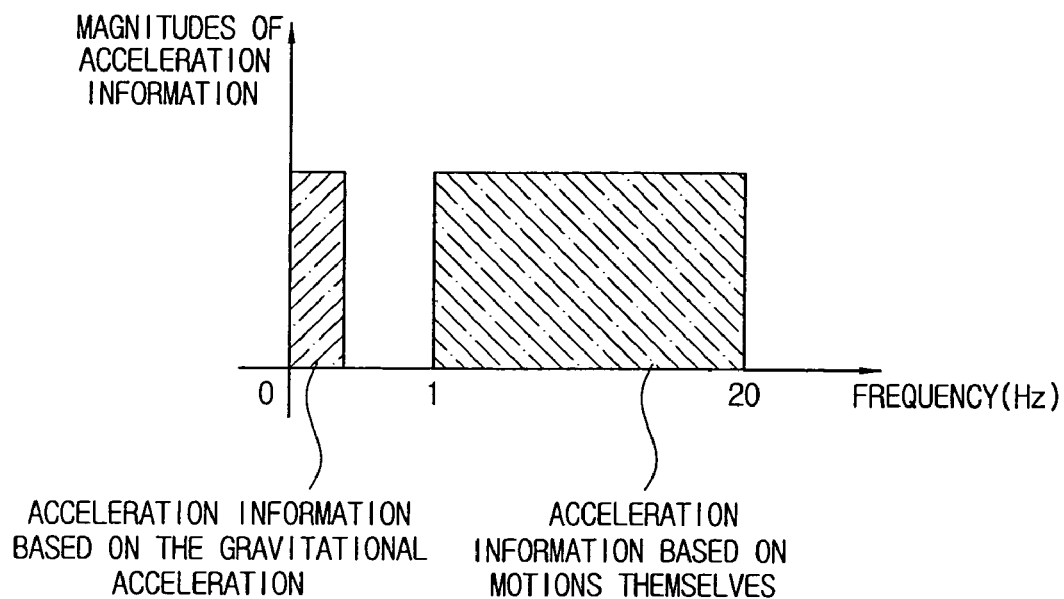
FIG. 4A is a graph for showing acceleration information on motions outputted from acceleration sensors.

FIG. 4A is a graph for showing motion acceleration information outputted from the acceleration sensors 110.

In general, motion acceleration information outputted from the acceleration sensors is composite information of acceleration information based on the gravitational acceleration and acceleration information based on motions themselves. As shown in FIG. 4A, acceleration information based on motions themselves generally exists in a frequency band ranging from 1 Hz to 20 Hz, and acceleration information based on the gravitational acceleration exists in a frequency band near 0 Hz.

Figure 4B:
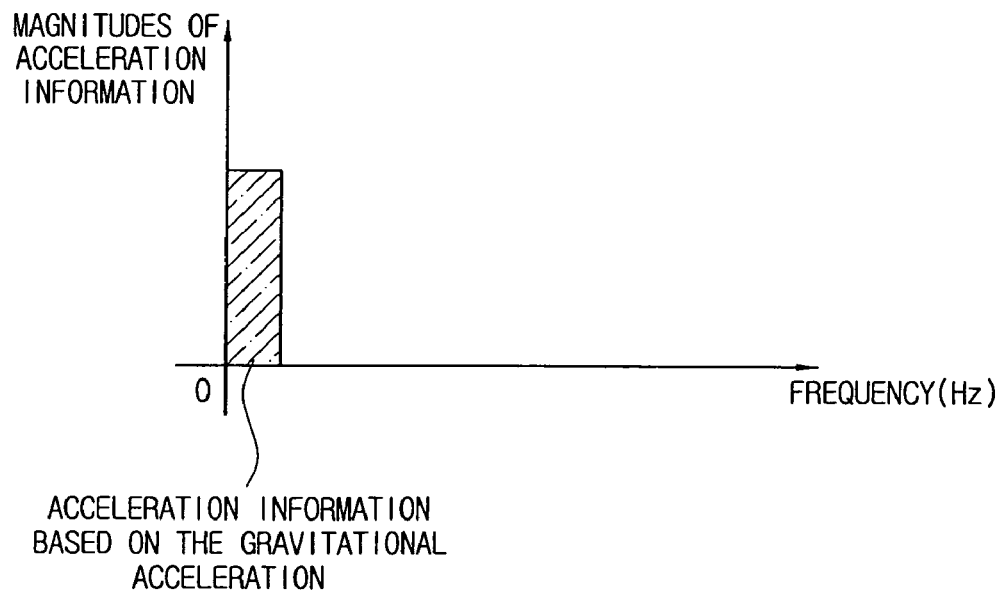
FIG. 4B is a graph for showing acceleration information in case that only the acceleration information based on the gravitational acceleration is separated from the acceleration information of FIG. 4A when a low-pass filter is provided in a separation unit.

FIG. 4B is a graph for showing acceleration information in case that only the acceleration information based on the gravitation acceleration is separated from the acceleration information of FIG. 4A with the separation unit 221 equipped with a low-pass filter.

In case that the separation unit 221 has a low-pass filter, acceleration information in a high-frequency band is not filtered for an output, but only the acceleration information in a low-frequency band is outputted. Therefore, as shown in FIG. 4B, only the acceleration information based on the gravitational acceleration is outputted.

Figure 5:
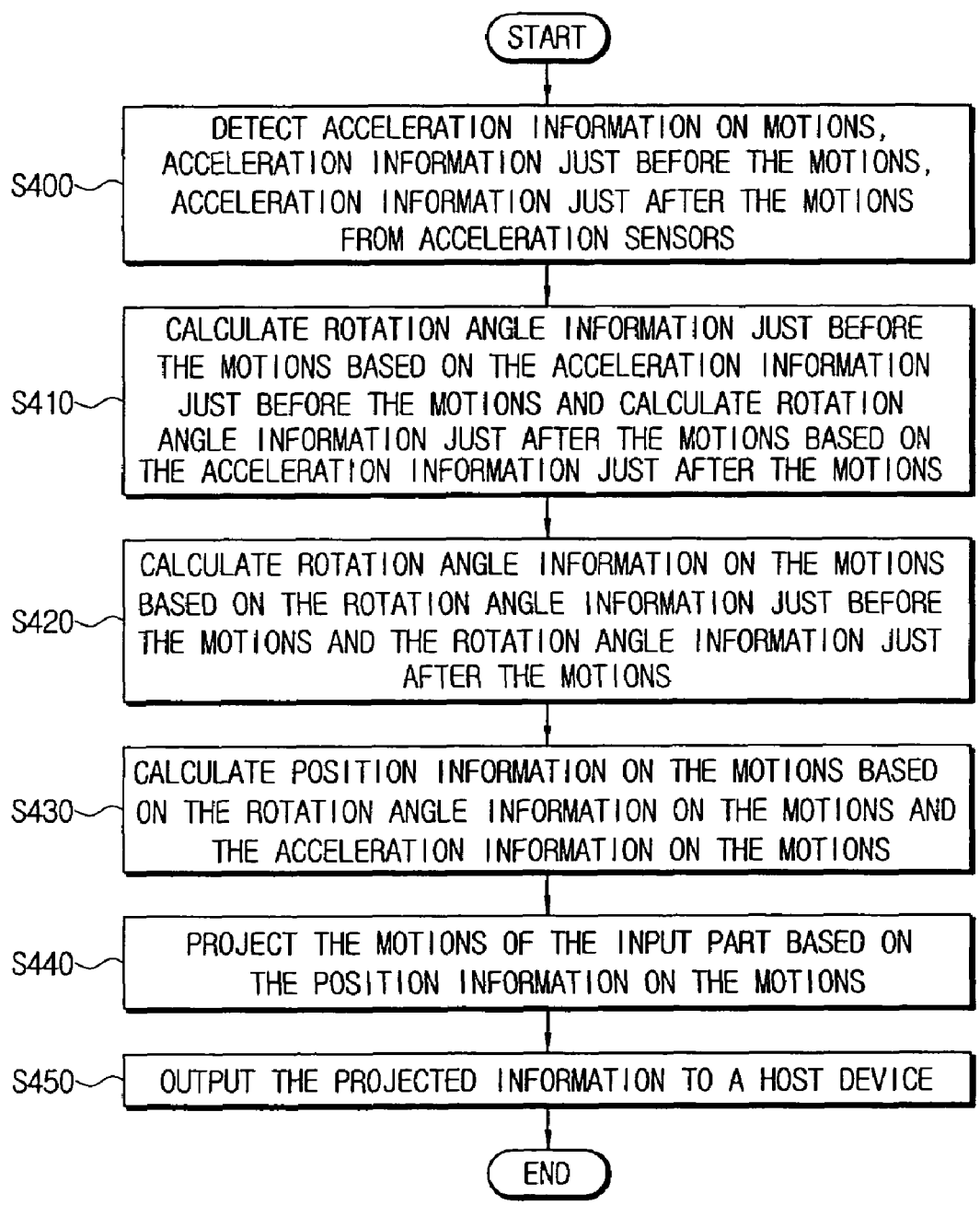
FIG. 5 is a flow chart for showing a trajectory estimation method for an input system of FIG. 2 according to an embodiment of the present invention.

FIG. 5 is a flow chart for showing a trajectory estimation method based on the input system according to the embodiment of FIG. 2.

Descriptions are made of the method with reference to FIG. 2 and FIG. 5. First, a user takes certain motions with the input part 100. The acceleration sensors 110 in the input part 100 detect and output motion acceleration information based on the motions of the input part 100 (S400).

The outputted acceleration information consists of pre-motion acceleration information, motion acceleration information, and post-motion acceleration information. The outputted pre-motion and post-motion acceleration information is inputted to the rotation angle information estimation-computing portion 120. The first computing unit 121 in the rotation angle information estimation-computing portion 120 applies Equations 4 and 5 to the pre-motion acceleration information and the post-motion acceleration information. Thus, pre-motion rotation angle information corresponding to the pre-motion acceleration information is calculated, and post-motion rotation angle information corresponding to the post-motion acceleration information is calculated (S410).

The calculated pre-motion rotation angle information and the post-motion rotation angle information are outputted to the second computing unit 122. The second computing unit 122 applies Equations 6 and 7 to the pre-motion rotation angle information and the post-motion rotation angle information. Accordingly, the motion rotation angle information is calculated (S420).

The calculated motion rotation angle information is outputted to the conversion-computing unit 130. Further, the acceleration information outputted from the acceleration sensors 110 is outputted to the conversion-computing unit 130. The conversion-computing unit 130 calculates motion position information for the navigation frame based on the inputted acceleration information and angular velocity information (S430).

The motion position information for the calculated navigation frame is projected onto an optimal plane by the optimal plane-computing unit 135 (S440). The position information projected on the optimal plane is outputted to the host device 300 through the transmission unit 140 (S450).

Figure 6:
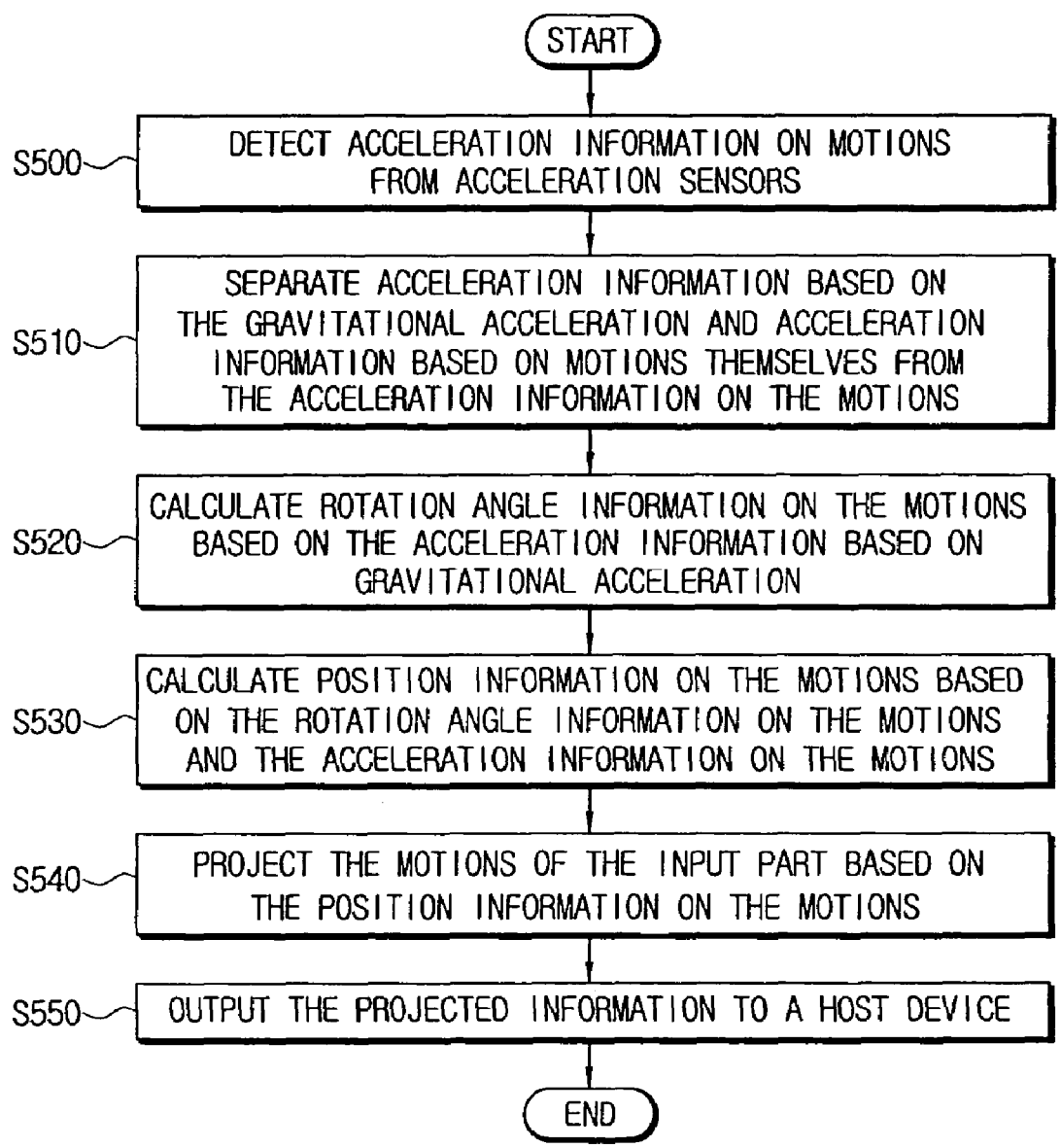
FIG. 6 is a flow chart for showing a trajectory estimation method for an input system of FIG. 3 according to another embodiment of the present invention.

FIG. 6 is a flow chart for showing a trajectory estimation method for the input system according to the embodiment of FIG. 3.

Descriptions are made with reference to FIG. 3 and FIG. 6. First, a user takes certain motions with the input part 200. The acceleration sensors 210 in the input part 200 outputs motion acceleration information based on the motions of the input part 200 (S500).

The outputted motion acceleration information consists of acceleration information based on the motions themselves and acceleration information based on the gravitational acceleration. The outputted motion acceleration information is inputted to the rotation angle information estimation-computing portion 220. The separation unit 221 in the rotation angle information estimation-computing portion 220 separates the inputted motion acceleration information into the acceleration information based on the motions themselves and the acceleration information based on the gravitational acceleration (S510).

The acceleration information based on the separated gravitational acceleration is inputted to the rotation angle information estimation-computing portion 220. The computing unit 222 in the rotation angle information estimation-computing portion 220 applies Equations 4 and 5 to the acceleration information based on the gravitational acceleration of the separated acceleration information. Accordingly, motion rotation angle information is calculated (S520).

The calculated motion rotation angle information is outputted to the conversion-computing unit 230. Further, the acceleration information outputted from the acceleration sensors 210 is outputted to the conversion-computing unit 230. The conversion-computing unit 230 calculates motion position information for the navigation frame based on the inputted acceleration information and angular velocity information (S530).

The calculated motion position information for the gravitational frame is projected onto an optimal plane by the optimal plane-computing unit 235 (S540). The position information projected on the optimal plane is outputted to the host device 300 through the transmission unit 240 (S550).

Figure 7A:
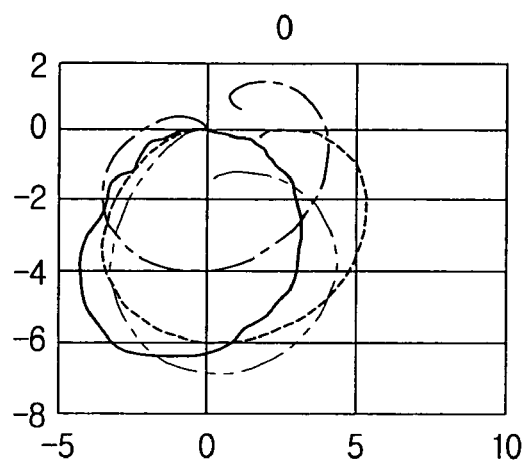
FIG. 7A is a view for showing results of certain numbers written by an input system to which the present invention is applied.
Figure 7A:
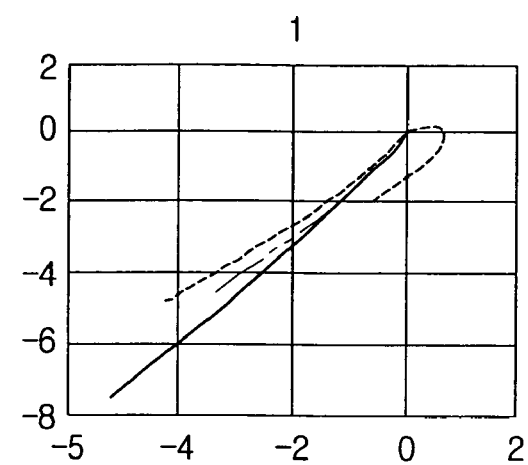
Figure 7A:
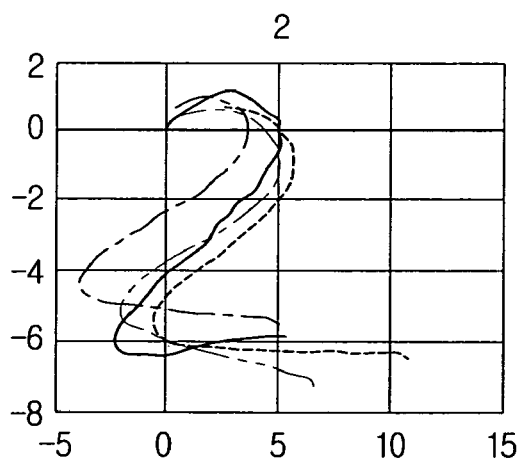
Figure 7A:
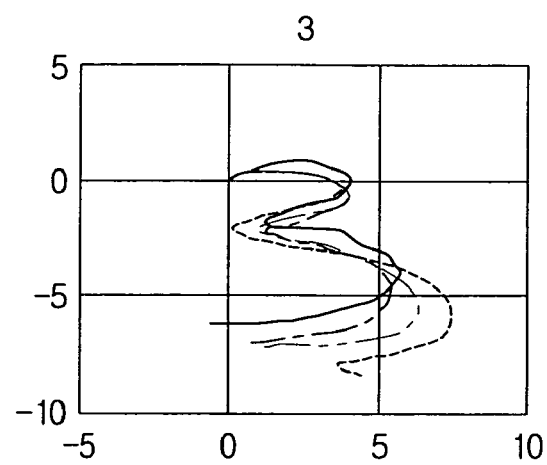

FIG. 7A illustrates results of certain numbers written by an input apparatus to which the present invention is applied.

FIG. 7A shows the experimental results for numbers 0~3.

The one-dotted lines in FIG. 7A indicate numbers written by an input part without angular velocity sensors according to the embodiment of FIG. 2. The dotted lines in FIG. 7A indicate numbers written by the input part without angular velocity sensors according to the embodiment of FIG. 3. The solid lines indicate numbers directly written on a tablet by a stylus pen. The two-dotted lines in FIG. 7A indicate numbers written by an input part with angular velocity sensors.

Figure 7B:
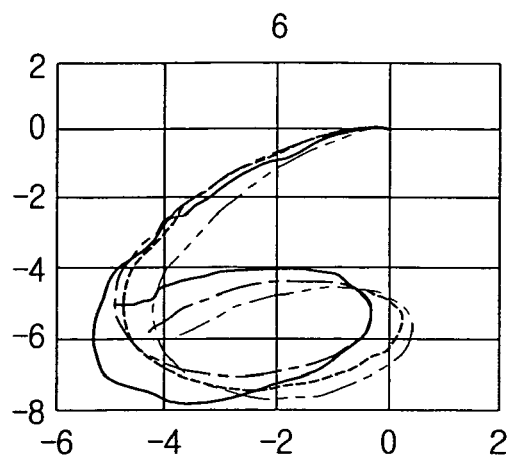
FIG. 7B is a view for showing results of other certain numbers written by an input system to which the present invention is applied.
Figure 7B:
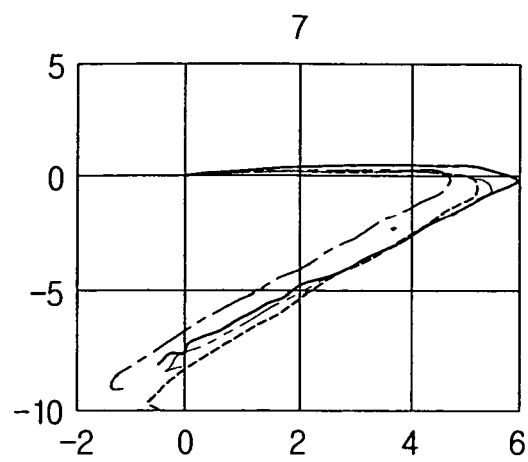
Figure 7B:
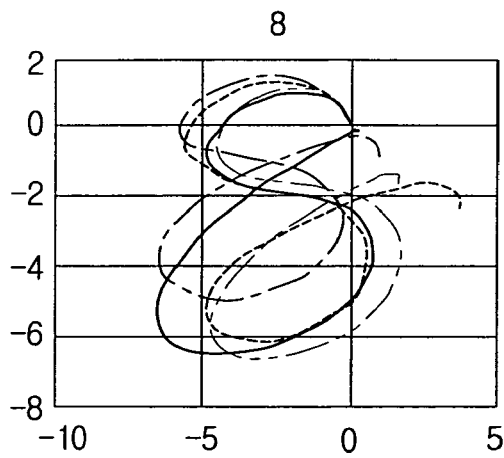
Figure 7B:
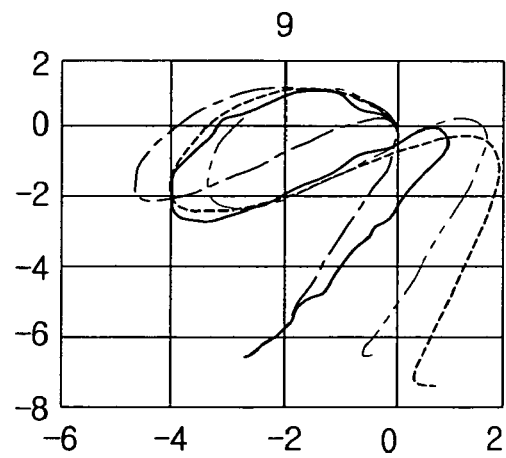
Figure 7C:
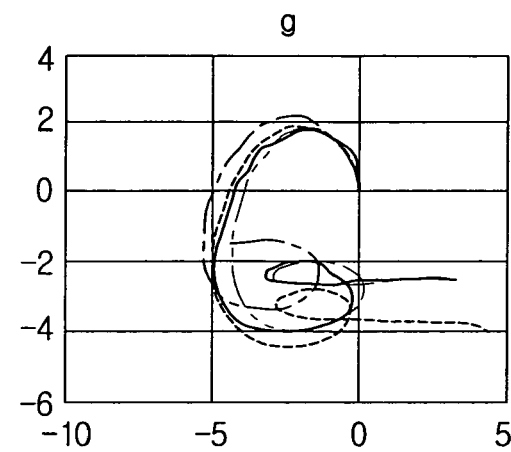
FIG. 7C is a view for showing results of certain letters written by an input system to which the present invention is applied.
Figure 7C:
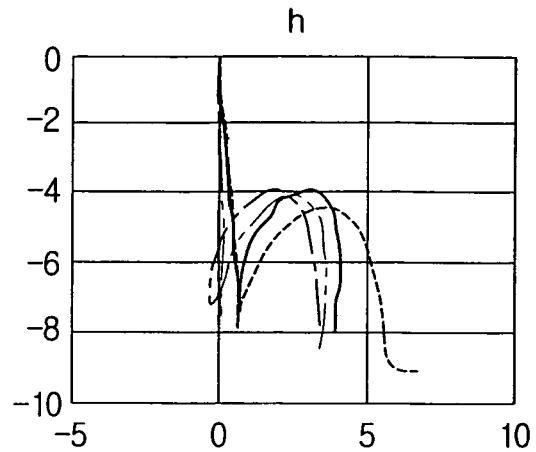
Figure 7C:
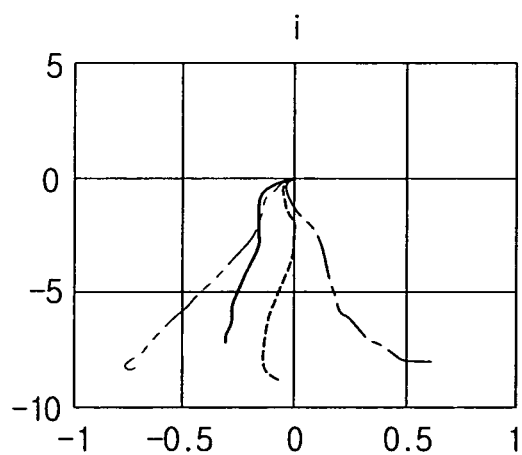
Figure 7C:
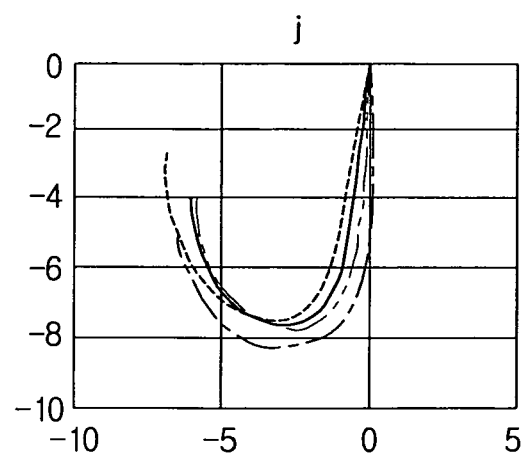

FIG. 7B illustrates results of other certain numbers written by the input part to which the present invention is applied, and FIG. 7C illustrates results of certain letters written by the input part to which the present invention is applied.

FIG. 7B shows an experimental result for numbers 6~9, and FIG. 7C shows an experimental result for English letters G, H, I, and J.

The descriptions on the one-dotted lines, dotted lines, solid lines, and two-dotted lines are the same as in FIG. 7A.

As shown in FIG. 7A, FIG. 7B, and FIG. 7C, the numbers and letters that are written by the input part with angular velocity sensors and directly written on the tablet are nearly the same as those that are written by the input parts according to the embodiments of the present invention, and, further, it can be seen that the degrees to which the writings can be recognized are nearly the same However, the embodiment presented in FIG. 2 and the embodiment present in FIG. 3 are each structured to perform a predetermined computing process in the input part so that only the position information as final processing result values is transmitted to the host device.

However, the above structure is exemplified for the above embodiments, and, for a different embodiment, the structure may be constructed in a different way in order that the input part detects only acceleration information outputted from the acceleration sensors, the detected acceleration information is transmitted to the host device through the transmission unit, and the host device performs the computing process by the rotation angle information estimation-computing portion, the computing process by the conversion-computing unit, and the optimal plane-computing process.

Further, for another embodiment, the structure may be constructed so that the input part detects acceleration information outputted from the acceleration sensors, the rotation angle information estimation-computing portion calculates rotation angle information based on the detected acceleration information, the calculated rotation angle information is transmitted to the host device through the transmission unit, and the host device performs the computing process by the conversion-computing unit and the optimal plane-computing process.

The input system based on the three-dimensional inertial navigation system and a trajectory estimation method thereof according to the present invention can recover three-dimensional motions in use of only three acceleration sensors without angular velocity sensors, rather than using three acceleration sensors and three angular velocity sensors as in the three-dimensional inertial navigation system. Further, the present invention can input any writings a user desires without limit to a time and place. Accordingly, the input system can be manufactured at a low cost since only three acceleration sensors are used, manufactured lightweight to be convenient in carrying, reduce power consumption, and eliminate the troublesomeness of initial correction work.

While the invention has been shown and described with reference to exemplary embodiments thereof for illustrative purposes, it will be understood by those skilled in the art that various changes in form and details may be made therein without departing from the spirit and scope of the invention as defined by the appended claims.

What is claimed is:

1. An input system based on a three-dimensional inertial navigation system and having an input part and a host device, and for detecting motion position information corresponding to three-dimensional motions of the input part and outputting the detected motion position information to the host device, comprising:

acceleration sensors for outputting pre-motion acceleration information, motion acceleration information, and post-motion acceleration information;

a rotation angle information estimation-computing portion for estimating motion rotation angle information $\Phi$, $\theta$, and $\Psi$ through a predetermined computing process based on the outputted pre-motion acceleration information and post-motion acceleration information;

a conversion-computing unit for calculating the motion position information based on the estimated motion rotation angle information and the outputted motion acceleration information; and an optimal plane-computing unit for projecting the motion position information onto an optimal plane.

2. The input system as claimed in claim 1, wherein the rotation angle information estimation-computing portion includes:

a first computing unit for calculating pre-motion rotation angle information $\Phi_1$, $\theta_1$, and $\Psi_1$ and post-motion rotation angle information $\Phi_2$, $\theta_2$, and $\Psi_2$ through a predetermined computing process based on the outputted pre-motion acceleration information and post-motion acceleration information; and a second computing unit for calculating the motion rotation angle information through a predetermined computing process based on the calculated pre-motion rotation angle information and post-motion rotation angle information.

3. The input system as claimed in claim 2, wherein the first computing unit calculates the pre-motion rotation angle information $\Phi 1$ and the post-motion rotation angle information $\Phi 2$ based on equations as follows:

$$\Phi 1 = \tan^{-1}\left(\frac{A_{by1}}{A_{bz1}}\right);$$

$$\Phi 2 = \tan^{-1}\left(\frac{A_{by2}}{A_{bz2}}\right)$$

where, if coordinate axes of a body frame of the input part are denoted as X, Y, and Z, $A_{by1}$ and $A_{by2}$ denote the pre-motion acceleration information and the post-motion acceleration information for the Y axis, respectively, and $A_{bz1}$ and $A_{bz2}$ denote the pre-motion acceleration information and the post-motion acceleration information for the Z axis, respectively, and, if coordinate axes for a navigation frame are denoted as $X_0$, $Y_0$, and $Z_0$, $\Psi 1$ and $\Psi 2$ denote the pre-motion rotation angle information and the post-motion rotation angle information for the $Z_0$ axis, and $\theta 1$ denotes the pre-motion rotation angle information for a $Y_1$ axis indicating an axis after the $Y_0$ axis is rotated as much as $\Psi 1$, $\theta 2$ denotes the post-motion rotation angle information for $Y_1$ axis indicating an axis after the $Y_0$ axis is rotated as much $\Psi 2$, $\Phi 1$ denotes the pre-motion rotation angle information for the $X_2$ indicating an axis after the $X_0$ axis is rotated as much as $\Psi 1$ and $\theta 1$, respectively, and $\Phi 2$ denotes the pre-motion rotation angle information for the $X_2$ axis indicating an axis after the $X_0$ is rotated as much as $\Psi 2$ and $\theta 2$, respectively.

4. The input system as claimed in claim 2, wherein the first computing unit calculates the pre-motion rotation angle information $\theta 1$ and the post-motion rotation angle information $\theta 2$ based on equations as follows:

$$\theta 1 = \tan^{-1}\left(\frac{A_{bx1}}{\sqrt{A_{by1}^2 + A_{bz1}^2}}\right),$$

$$\theta 2 = \tan^{-1}\left(\frac{A_{bx2}}{\sqrt{A_{by2}^2 + A_{bz2}^2}}\right)$$

where, if coordinate axes of a body frame of the input part are denoted as X, Y, and Z, $A_{bx1}$ and $A_{bx2}$ denote the pre-motion acceleration information and the post-motion acceleration information for the X axis, respectively, and $A_{by1}$ and $A_{by2}$ denote the pre-motion acceleration information and the post-motion acceleration information for the Y axis, respectively, and $A_{bz1}$ and $A_{bz2}$ denote the pre-motion acceleration information and the post-motion acceleration information for the Z axis, respectively, and, if coordinate axes for a navigation frame are denoted as $X_0$, $Y_0$, and $Z_0$, $\Psi 1$ and $\Psi 2$ denote the pre-motion rotation angle information and the post-motion rotation angle information for the $Z_0$ axis, and $\theta 1$ denotes the pre-motion rotation angle information for a $Y_1$ axis indicating an axis after the $Y_0$ axis is rotated as much as $\Psi 1$, and $\theta 2$ denotes the post-motion rotation angle information for $Y_1$ axis indicating an axis after the $Y_0$ axis is rotated as much as $\Psi 2$.

5. The input system as claimed in claim 2, wherein the second computing unit calculates the motion rotation angle information $\Phi$ by an equation as follows:

$$\Phi(t)=a*t+b$$

where, if $t_1$ denotes time just before the motions, $t_2$ denotes time just after the motions, a denotes $[t(t_2)-\Phi(t_1)]/(t_2-t_1)$, b denotes $-a*t_1+\Phi(t_1)$, and coordinate axes for a navigation frame are denoted as $X_0$, $Y_0$, and $Z_0$, then the $\Psi$ denotes the rotation angle information for the $Z_0$ axis, the $\theta$ denotes the rotation angle information for the $Y_1$ axis indicating an axis after the $Y_0$ axis is rotated as much $\Psi$, and the $\Phi$ denotes the rotation angle information for the $X_2$ axis indicating an axis after the $X_0$ axis is rotated as much as $\Psi$ and $\theta$, respectively.

6. The input system as claimed in claim 2, wherein the second computing unit calculates the motion rotation angle information $\theta$ based on an equation as follows:

$$\theta(t)=c*t+d$$

where, if $t_1$ denotes time just before the motions, $t_2$ denotes time just after the motions, c denotes $[\theta(t_2)-\theta(t_1)]/(t_2-t_1)$, d denotes $-c*t_1+\theta(t_1)$, and coordinate axes are denoted as $X_0$, $Y_0$, and $Z_0$, then $\Psi$ denotes the rotation angle information for the $Z_0$ axis and the $\theta$ denotes the rotation angle information for the $Y_1$ axis indicating an axis after the $Y_0$ axis is rotated as much as $\Psi$.

7. An input system based on a three-dimensional inertial navigation system and having an input part and a host device, and for detecting motion position information corresponding to three-dimensional motions of the input part and outputting the detected motion position information to the host device, comprising:

acceleration sensors for outputting motion acceleration information;

a rotation angle information estimation-computing portion for estimating motion rotation angle information $\Phi$, $\theta$, and $\Psi$ based on acceleration information based on gravitational acceleration separated from the outputted motion acceleration information;

a conversion-computing unit for calculating motion position information based on the estimated motion rotation angle information and the outputted motion acceleration information; and an optimal plane-computing unit for projecting the motion position information onto an optimal plane.

8. The input system as claimed in claim 7, wherein the rotation angle information estimation-computing portion includes:

a separation unit for separating acceleration information based on the motions of the input part itself and acceleration information based on the gravitational acceleration from the outputted motion acceleration information based on a predetermined process; and a computing unit for calculating the motion rotation angle information through a predetermined computing process based on the acceleration information based on the separated gravitational acceleration.

9. The input system as claimed in claim 8, wherein the predetermined process for separating the acceleration information based on the gravitational acceleration from the motion acceleration information is to pass the motion acceleration information through a low-pass filter.

10. The input system as claimed in claim 8, wherein the computing unit calculates the motion rotation angle information $\Phi$ based on an equation as follows:

$$\Phi = \tan^{-1}\left(\frac{A_{by}}{A_{bz}}\right)$$

where, if coordinate axes of a body frame of the input part are denoted as X, Y, and Z, $A_{by}$ denotes acceleration information for the Y axis and $A_{bz}$ denotes acceleration information for the Z axis, and, if coordinate axes for a navigation frame are denoted as $X_0$, $Y_0$, and $Z_0$, $\Psi$ denotes rotation angle information for the $Z_0$ axis, $\theta$ denotes rotation angle information for a $Y_1$ axis indicating an axis after the $Y_0$ axis is rotated as much as $\Psi$, and $\Phi$ denotes rotation angle information for an $X_2$ indicating an axis after the $X_0$ is rotated as much as $\Psi$ and $\theta$, respectively.

11. The input system as claimed in claim 8, wherein the computing unit calculates the motion rotation angle information $\theta$ based on an equation as follows:

$$\theta = \tan^{-1}\left(\frac{A_{bx}}{\sqrt{A_{by}^2 + A_{bz}^2}}\right)$$

where, if coordinate axes for the body frame are denoted as X, Y, and Z, $A_{bx}$ denotes acceleration information for the X axis, $A_{by}$ denotes acceleration information for the Y axis, $A_{bz}$ denotes acceleration information for the Z axis, and if coordinate axes for a navigation frame are denoted as $X_0$, $Y_0$, and $Z_0$, $\Psi$ denotes rotation angle information for the $Z_0$ axis and $\theta$ denotes rotation angle information for a $Y_1$ axis indicating an axis after the $Y_0$ is rotated as much as $\Psi$.

12. A trajectory estimation method for an input system based on a three-dimensional inertial navigation system and having an input part and a host device, and for detecting motion position information corresponding to three-dimensional motions of the input part and outputting the detected motion position information to the host device, comprising:

(a) outputting motion acceleration information, pre-motion acceleration information, and post-motion acceleration information just after the motions;

(b) estimating motion rotation angle information $\Phi$, $\theta$, and $\Psi$ through a predetermined computing process based on the outputted pre-motion acceleration information and post-motion acceleration information;

(c) calculating the motion position information based on the estimated motion rotation angle information and the outputted motion acceleration information; and (d) projecting the motion position information onto an optimal plane.

13. The trajectory estimation method as claimed in claim 12, wherein the step(b) includes:

(b1) calculating pre-motion rotation angle information $\Phi 1$, $\theta 1$, and $\Psi 1$ and post-motion rotation angle information $\Phi 2$, $\theta 2$, and $\Psi 2$ through a predetermined computing process based on the outputted pre-motion acceleration information and post-motion acceleration information; and (b2) calculating the motion rotation angle information through a predetermined computing process based on the calculated pre-motion rotation angle information and post-motion rotation angle information.

14. The trajectory estimation method as claimed in claim 13, wherein the step(b1) calculates the pre-motion rotation angle information $\Phi 1$ and the post-motion rotation angle information $\Phi 2$ based on equations as follows:

$$\Phi 1 = \tan^{-1}\left(\frac{A_{by1}}{A_{bz1}}\right);$$

$$\Phi 2 = \tan^{-1}\left(\frac{A_{by2}}{A_{bz2}}\right)$$

where, if coordinate axes of a body frame of the input part are denoted as X, Y, and Z, $A_{by1}$ and $A_{by2}$ denote the pre-motion acceleration information and the post-motion acceleration information for the Y axis, respectively, and $A_{bz1}$ and $A_{bz2}$ denote the pre-motion acceleration information and the post-motion acceleration information for the Z axis, respectively, and, if coordinate axes for a navigation frame are denoted as $X_0$, $Y_0$, and $Z_0$, $\Psi 1$ and $\Psi 2$ denote the pre-motion rotation angle information and the post-motion rotation angle information for the $Z_0$ axis, and $\theta 1$ denotes the pre-motion rotation angle information for a $Y_1$ axis indicating an axis after the $Y_0$ axis is rotated as much as $\Psi 1$, $\theta 2$ denotes the post-motion rotation angle information for $Y_1$ axis indicating an axis after the $Y_0$ axis is rotated as much as $\Psi 2$, $\Phi 1$ denotes the pre-motion rotation angle information for the $X_2$ indicating an axis after the $X_0$ axis is rotated as much as $\Psi 1$ and $\theta 1$, respectively, and $\Phi 2$ denotes the pre-motion rotation angle information for the $X_2$ axis indicating an axis after the $X_0$ is rotated as much as $\Psi 2$ and $\theta 2$, respectively.

15. The trajectory estimation method as claimed in claim 13, wherein the step(b1) calculates the pre-motion rotation angle information $\theta 1$ and the post-motion rotation angle information $\theta 2$ based on equations as follows:

$$\theta 1 = \tan^{-1}\left(\frac{A_{bx1}}{\sqrt{A_{by1}^2 + A_{bz1}^2}}\right),$$

$$\theta 2 = \tan^{-1}\left(\frac{A_{bx2}}{\sqrt{A_{by2}^2 + A_{bz2}^2}}\right)$$

where, if coordinate axes of a body frame of the input part are denoted as X, Y, and Z, $A_{bx1}$ and $A_{bx2}$ denote the pre-motion acceleration information and the post-motion acceleration information for the X axis respectively, and $A_{by1}$ and $A_{by2}$ denote the pre-motion acceleration information and the post-motion acceleration information for the Y axis respectively, and $A_{bz1}$ and $A_{bz2}$ denote the pre-motion acceleration information and the post-motion acceleration information for the Z axis respectively, and, if coordinate axes for a navigation frame are denoted as $X_0$, $Y_0$, and $Z_0$, $\Psi 1$ and $\Psi 2$ denote the pre-motion rotation angle information and the post-motion rotation angle information for the $Z_0$ axis, and $\theta 1$ denotes the pre-motion rotation angle information for a $Y_1$ axis indicating an axis after the $Y_0$ axis is rotated as much as $\Psi 1$, and $\theta 2$ denotes the post-motion rotation angle information for $Y_1$ axis indicating an axis after the $Y_0$ axis is rotated as much as $\Psi 2$.

16. The trajectory estimation method as claimed in claim 13, wherein the step(b2) calculates the motion rotation angle information $\Phi$ by an equation as follows:

$$\Phi(t)=a*t+b$$

where, if $t_1$ denotes time just before the motions, $t_2$ denotes time just after the motions, a denotes $[\Phi(t_2)-\Phi(t_1)]/(t_2-t_1)$, b denotes $-a*t_1+\Phi(t_1)$, and coordinate axes are denoted as $X_0$, $Y_0$, and $Z_0$, then the $\Psi$ denotes the rotation angle information for the $Z_0$ axis, the $\theta$ denotes the rotation angle information for the $Y_1$ axis indicating an axis after the $Y_0$ axis is rotated as much as $\Psi$, and the $\Phi$ denotes the rotation angle information for the $X_2$ axis indicating an axis after the $X_0$ axis is rotated as much as $\Psi$ and $\theta$, respectively.

17. The trajectory estimation method as claimed in claim 13, wherein the step(b2) calculates the motion rotation angle information $\theta$ based on an equation as follows:

$$\theta(t)=c*t+d$$

where, if $t_1$ denotes time just before the motions, $t_2$ denotes time just after the motions, c denotes $[\theta(t_2)-\theta(t_1)]/(t_2-t_1)$, d denotes $-c*t_1+\theta(t_1)$, and coordinate axes are denoted as $X_0$, $Y_0$, and $Z_0$, then $\Psi$ denotes the rotation angle information for the $Z_0$ axis and the $\theta$ denotes the rotation angle information for the $Y_1$ axis indicating an axis after the $Y_0$ axis is rotated as much as $\Psi$.

18. A trajectory estimation method for an input system based on a three-dimensional inertial navigation system and having an input part and a host device, and for detecting motion position information corresponding to three-dimensional motions of the input part and outputting the detected motion position information to the host device, comprising:

(a) outputting motion acceleration information;

(b) estimating motion rotation angle information $\Phi$, $\theta$, and $\Psi$ based on acceleration information based on gravitational acceleration separated from the outputted motion acceleration information;

(c) calculating motion position information based on the estimated motion rotation angle information and the outputted motion acceleration information; and (d) projecting the motion position information onto an optimal plane.

19. The trajectory estimation method as claimed in claim 18, wherein the step(b) includes:

(b1) separating acceleration information based on the motions of the input part itself and acceleration information based on the gravitational acceleration from the outputted motion acceleration information based on a predetermined process; and (b2) calculating the motion rotation angle information through a predetermined computing process based on the acceleration information based on the separated gravitational acceleration.

20. The trajectory estimation method as claimed in claim 19, wherein the predetermined process in the step (b1) is to pass the motion acceleration information through a low-pass filter.

21. The trajectory estimation method as claimed in claim 19, wherein the motion rotation angle information $\Phi$ in the step(b2) is calculated based on an equation as follows:

$$\Phi = \tan^{-1}\left(\frac{A_{by}}{A_{bz}}\right)$$

where, if coordinate axes of a body frame of the input part are denoted as X, Y, and Z, $A_{by}$ denotes acceleration information for the Y axis and $A_{bz}$ denotes acceleration information for the Z axis, and, if coordinate axes for a navigation frame are denoted as $X_0$, $Y_0$, and $Z_0$, $\Psi$ denotes rotation angle information for the $Z_0$ axis, $\theta$ denotes rotation angle information for a $Y_1$ axis indicating an axis after the $Y_0$ axis is rotated as much as $\Psi$, and $\Phi$ denotes rotation angle information for an $X_2$ indicating an axis after the $X_0$ is rotated as much as $\Psi$ and $\theta$, respectively.

22. The trajectory estimation method as claimed in claim 19, wherein the motion rotation angle information $\theta$ in the step(b2) is calculated based on an equation as follows:

$$\theta = \tan^{-1}\left(\frac{A_{bx}}{\sqrt{A_{by}^2+A_{bz}^2}}\right)$$

where, if coordinate axes for the body frame are denoted as X, Y, and Z, $A_{bx}$ denotes acceleration information for the X axis, $A_{by}$ denotes acceleration information for the Y axis, $A_{bz}$ denotes acceleration information for the Z axis, and if coordinate axes for a navigation frame are denoted as $X_0$, $Y_0$, and $Z_0$, $\Psi$ denotes rotation angle information for the $Z_0$ axis and $\theta$ denotes rotation angle information for a $Y_1$ axis indicating an axis after the $Y_0$ is rotated as much as $\Psi$.

* * * * *